United States Patent

[11] 3,615,725

[72] Inventor Johannes Bernardus Van Der Winden
 Amstelveen, Netherlands
[21] Appl. No. 15,694
[22] Filed Mar. 2, 1970
[45] Patented Oct. 26, 1971
[73] Assignee Gebr. Stork & Co's Apparatenfabriek N.V.
 Amsterdam, Netherlands
[32] Priority Dec. 1, 1965
[33] Netherlands
[31] 65.15636
 Continuation-in-part of application Ser. No.
 570,896, Aug. 8, 1966, now abandoned.

[54] METHOD AND APPARATUS FOR THE THERMAL TREATMENT UNDER PRESSURE OF COMMODITIES PACKED IN CONTAINERS
3 Claims, 1 Drawing Fig.
[52] U.S. Cl. .................................................. 99/214,
 21/56, 21/91, 99/362
[51] Int. Cl. .................................................. A23l 3/04
[50] Field of Search .................................................. 99/214,
 360, 362, 249, 251; 21/56, 91, 92

[56] References Cited
UNITED STATES PATENTS

| 3,469,988 | 9/1969 | Yawger | 99/214 X |
| 1,584,397 | 5/1926 | Paxton | 99/214 |
| 2,660,512 | 11/1953 | Webster | 21/56 |
| 2,701,205 | 2/1955 | Ekelund | 99/214 |
| 3,340,791 | 9/1967 | Mencacci et al. | 99/214 X |

FOREIGN PATENTS

| 1,033,376 | 7/1958 | Germany | 99/214 |

Primary Examiner—Joseph Scovronek
Assistant Examiner—Stephen B. Davis
Attorney—Waters, Roditi, Schwartz & Nissen ABSTRACT: Package commodities are transported into a treatment space which contains a mixture of steam and air maintained at 2 atm. gauge and 120° C. and a quantity of liquid at the bottom of the space. The liquid in the bottom of the space is cooled thereat to maintain its temperature below 100° C. The treatment space is isolated from the ambient atmosphere by inlet and outlet liquid locks which communicate with the liquid in the bottom of the space.

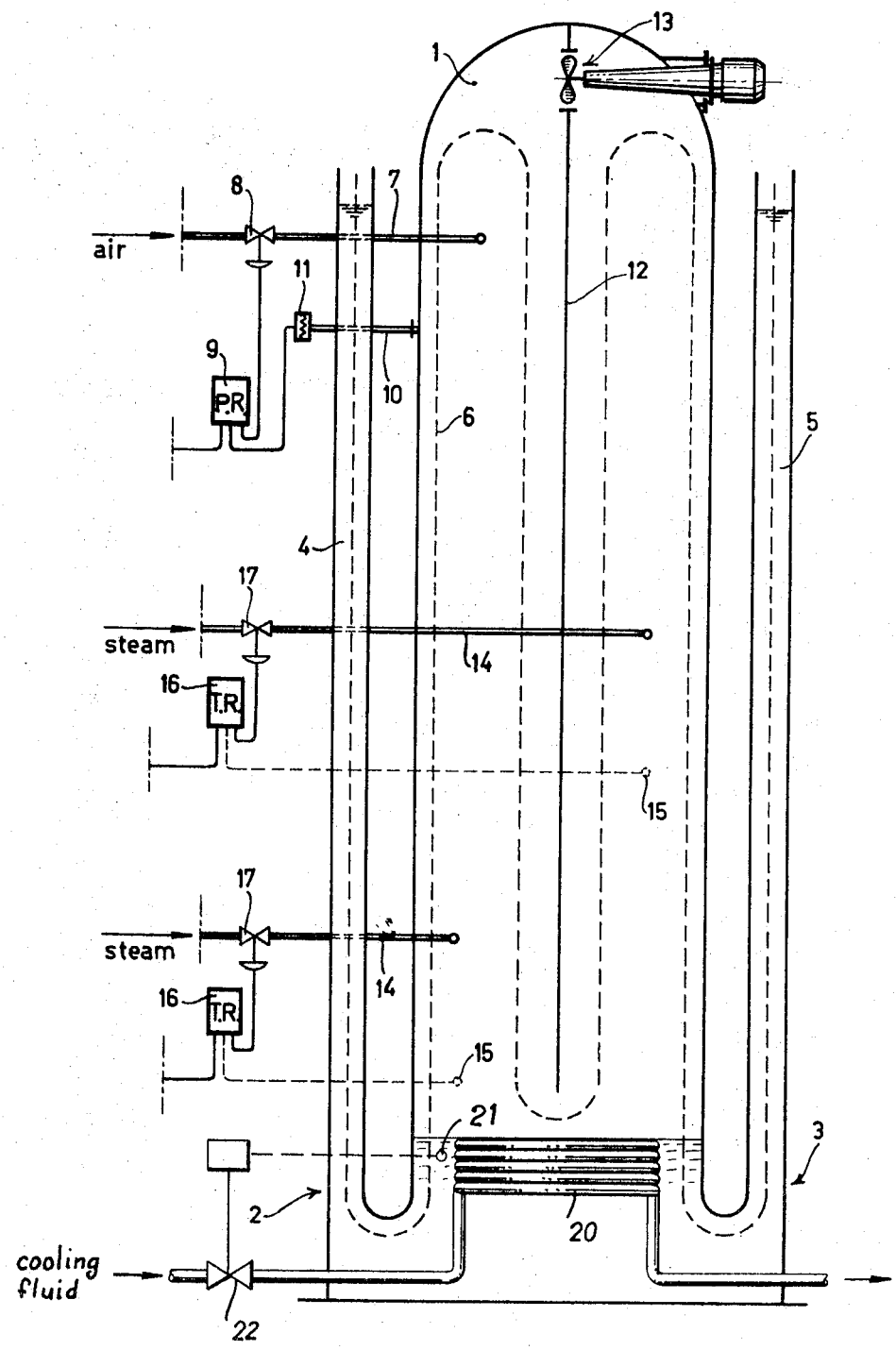

METHOD AND APPARATUS FOR THE THERMAL TREATMENT UNDER PRESSURE OF COMMODITIES PACKED IN CONTAINERS this is a continuation-in-part of my earlier application Ser. No. 570,896, filed Aug. 8, 1966 and now abandoned claiming the priority of my application filed in The Netherlands Dec. 1, 1965.

BRIEF SUMMARY OF THE INVENTION

My invention relates to a method for the operation of an installation intended for the thermal treatment under pressure of commodities packed in containers, especially for the sterilization or pasteurization of foodstuffs in jars with large covers, the installation comprising a treatment space, sealed from the atmosphere, said space being at least at one location connected to one side (high-pressure or H.P. side) of a liquid lock of which the other side (low-pressure or L.P. side) communicates with the atmosphere, an endless conveyor with carriers for the containers advancing through the treatment space and through each liquid lock, means being provided for feeding compressed air to the H.P. side of the liquid lock in order to control the desired pressure in the treatment space.

Such a method is known for sterilization, the treatment space proper being filled with water which is maintained at a temperature as desired for the sterilization, the required pressure within the installation being maintained by means of an additional supply of air at a value such that the pressure occurring within the containers are not capable of loosening the covers entirely or partially. The sterilization temperature is considerably over 100° C. whereby the sterilization space is filled with a substance which to an extent is explosive. Namely, if the pressure within the installation should be reduced, owing to one cause or another, the entire quantity of liquid in the sterilization space rapidly vaporizes and may explode.

It is an object of the invention to provide a method whereby in such an installation a considerably safer process is obtained with substantially the same good results, the described risk being fully avoided.

Another object of the invention is to replace the known "wet" treatment by a dry sterilization or pasteurization, with a vigorous circulation of a steam/air mixture within the treatment space for ensuring the proper transfer of heat while moreover blowing away any film of condensate. A still further object of the invention is to provide a wider choice of the temperature of treatment which can be selected both over and under 100° C., while independently thereof the temperature of the liquid lock can be maintained under 100° C.

The invention relates further to an installation intended for the thermal treatment under pressure of commodities packed in containers, especially for the sterilization and pasteurization of foodstuffs in jars with large covers, said installation comprising a treatment space sealed with respect to the atmosphere and which at least at one location is connected to one side (H.P. side) of a liquid lock while the other side (L.P. side) of the liquid lock communicates with the atmosphere, an endless conveyor with carriers for the containers being capable of advancing through treatment space and through each liquid lock and outside the installation, means being provided for feeding compressed air to the H.P. side of the liquid lock.

It is a still further object of the invention to provide an installation making it possible to exert, independently of the temperature applied in the treatment space, i.e., both on pasteurizing and on sterilizing, a sufficient counter pressure on the covers in order to prevent the same from jumping off the jars.

The foregoing and other objects and advantages of the invention will appear in the description to follow. In the description reference is made to the accompanying drawing, which forms a part hereof.

BRIEF DESCRIPTION OF THE DRAWING

The sole FIGURE of the drawing is a diagrammatic elevation view of an embodiment of the invention.

DETAILED DESCRIPTION

The installation consists of a treatment space 1 which is sealed with respect to the surrounding atmosphere. The space 1 communicates via liquid locks 2 and 3 indirectly with the atmosphere. Each liquid lock 2, 3 consists in the usual way of respective columns 4, 5 of which the upper end constitutes the so-called L.P. side and the lower end forms the so-called H.P. side. An endless conveyor 6 provided with carriers (not shown) for the containers (also not shown) moves through the treatment space 1 and through the columns 4 and 5 to the exterior of the installation.

In the space 1 on the H.P. side of the liquid lock 2 is a duct 7 for the supply of compressed air. This supply is effected via a valve 8 which is controlled by a pressure regulator 9 which in turn receives an impulse via a duct 10 which on the one hand opens into the treatment space 1 and on the other hand is connected with a pressure gauge 11. The valve 8 controls the supply duct 7 to pressurize the space 1 at a predetermined value above atmospheric. Preferably, the pressure in the treatment space is about 2 atm. gauge.

The space 1 is divided in two parts by means of an intermediate wall 12. This wall 12 extends as far as the top of the space 1, a blower 13 being disposed in the upper part in order to circulate the fluid in the space 1. The blower 13 is constructed to provide a circulation within the space 1 of a velocity of at least 10 m./sec.

Steam conduits 14 open into both parts of the treatment space 1, and a temperature sensor 15 is provided in each part of the treatment space. Each sensor 15 communicates with a respective regulator 16 operating a valve 17 of an associated steam conduit 14 to control the temperature in space 1 and remain at about 120° C.

The installation described hereinbefore is operated in such a manner that the part of the space 1, through which the conveyor 6 advances, is exclusively filled with a steam/air mixture. The liquid level at the H.P. side of the two liquid locks 2 and 3 is maintained at a sufficiently low level by means of a compressed air supply through the duct 7, that the desired pressure in the space 1 is obtained and that the conveyor 6, with the carriers, on traversing the treatment path in the two parts of the space 1 does not come into contact with the liquid.

This air supply via the conduit 7 is intended to maintain the pressure in the sterilization space 1 at a higher value then that corresponding to the partial pressure of the steam. In this way the inconvenience of the covers jumping off the containers to be treated is eliminated. The same air supply also aids in lowering the temperature of the liquid at the H.P. side of each liquid lock 2, 3 i.e. at the lower end of the space 1, independently of the temperature in the treatment space 1 proper. This helps to make possible keeping the temperature of this liquid under 100° C. The latter circumstance is of importance for a possible sudden pressure decrease in the space 1 which could cause vaporization of the liquid in the liquid locks if the liquid temperature was above 100° C. In order to insure cooling of the liquid in locks 2 and 3 at the H.P. side thereof to keep the temperature of the liquid below 100° C., a cooling coil 20 is placed in the liquid for circulation of a cooling fluid therethrough. The coil 20 is supplied with cooling fluid in accordance with the temperature measured in the liquid lock by a temperature sensor 21, said sensor acting through a temperature regulator on a valve 22 which controls admission of cooling fluid to coil 20. As an alternative, it is also possible to supply cold water directly into the liquid lock at the H.P. side at the bottom of the treatment chamber to keep the temperature of the liquid in the lock below 100° C. Even in the event of a maximum drop of pressure in space 1 to atmospheric pressure, the liquid in the lock cannot suddenly vaporize, as would be the case at a temperature above 100° C., which prevails in the known sterilization installations.

While a preferred embodiment of the invention has been shown and described, it is to be understood that changes and variations may be made without departing from the spirit and scope of the invention as defined in the appended claims.

What is claimed is:

1. A method for the thermal treatment, under pressure, of commodities packed in containers, said method comprising forming a treatment space for the containers, providing an inlet and an outlet for the treatment space respectively containing a quantity of water to isolate said space from the ambient atmosphere, and provide water at the bottom of the treatment space, advancing the containers to be treated through said inlet, the treatment space, and the outlet, in that order, supplying compressed air into said treatment space to pressurize the same to a pressure of 2 atm. gauge, supplying steam to said treatment space to form an air/steam mixture in said space and maintain the temperature in said space at a value of about 120° C., and controlling the temperature of the water at the lower part of the treatment space by cooling said water thereat to maintain the temperature of the water at the lower part of the treatment space below 100° C.

2. Apparatus for the thermal treatment under pressure of commodities packed in containers, said apparatus comprising a vessel defining a treatment space for the containers, means respectively defining an inlet to the treatment space and an outlet from the treatment space at the lower part thereof, a liquid in said vessel which constitutes a liquid lock between the lower part of the treatment space and the atmosphere, means for transporting the containers through the inlet into said treatment space and then to the outlet, means for supplying compressed air to the treatment space to pressurize the same, means for supplying steam to the treatment space to form a steam/air mixture in the treatment space at a temperature above 100° C., means in the lower part of the treatment space for maintaining the temperature in the liquid at the lower part of the treatment space at a value under 100° C., and temperature-sensing means said space and coupled to said steam supply means to control the supply of steam to said space.

3. Apparatus as claimed in claim 2 wherein said means for maintaining the temperature in the liquid in the lower part of the treatment space at a value under 100° C. comprises coiling means immersed in said liquid.

* * * * *